(12) United States Patent
Withey (10) Patent No.: US 10,239,132 B2
(45) Date of Patent: Mar. 26, 2019

(54) MACHINING TOOL

(71) Applicant: ROLLS-ROYCE PLC, London (GB)

(72) Inventor: James Robert Withey, Alfreton (GB)

(73) Assignee: ROLLS-ROYCE plc, London (GB)

( * ) Notice: Subject to any disclaimer, the term of this patent is extended or adjusted under 35 U.S.C. 154(b) by 121 days.

(21) Appl. No.: 14/878,349

(22) Filed: Oct. 8, 2015

(65) Prior Publication Data

US 2016/0121409 A1 May 5, 2016

(30) Foreign Application Priority Data

Nov. 5, 2014 (GB) ...................................... 1419695

(51) Int. Cl.
*B23C 3/00* (2006.01)
*B23C 3/02* (2006.01)
(Continued)

(52) U.S. Cl.
CPC ................ *B23C 3/02* (2013.01); *F01D 25/24* (2013.01); *F01D 25/285* (2013.01); *F02C 7/04* (2013.01);
(Continued)

(58) Field of Classification Search
CPC ... Y10T 409/306384; Y10T 409/30644; Y10T 409/300392; Y10T 409/300504; Y10T 409/30056; Y10T 409/300616; Y10T 409/300784; Y10T 409/307616; Y10T 409/30756; Y10T 409/303752; Y10T 409/303808; Y10T 409/304424; B23C 3/02; B23C 3/18; B23C 3/16; B23C 3/161; B23C 3/162; B23C 2215/04;
(Continued)

(56) References Cited

U.S. PATENT DOCUMENTS

| 2,116,248 A | 5/1938 | Moser |
| 2,188,720 A * | 1/1940 | McQuade ............... B24B 23/08 |
| | | 451/441 |

(Continued)

FOREIGN PATENT DOCUMENTS

| EP | 1918524 A2 | 5/2008 |
| GB | 2240735 A | 8/1991 |

OTHER PUBLICATIONS

Jan. 30, 2015 Search Report issued in British Patent Application No. 1419695.0.

(Continued)

*Primary Examiner* — Nicole N Ramos
(74) *Attorney, Agent, or Firm* — Oliff PLC (57) ABSTRACT

An attrition liner machining tool, configured to machine the surface of an attrition liner provided radially outward of a set of a plurality of fan blades in a gas turbine engine. The tool includes at least one rotating machine tool having a connector at a first end and a cutter at a second end. The connector is configured to rigidly connect to a rotating fan blade mount of the gas turbine engine that, in use of the gas turbine engine, supports the fan blades. The cutter is configured to machine the attrition liner. The at least one rotating machine tool is configured such that, when it is connected to said rotating fan blade mount of a gas turbine engine, the cutter is passed across the surface of the attrition liner when said rotating fan blade mount is rotated.

14 Claims, 5 Drawing Sheets

(51) Int. Cl.
*F01D 25/28* (2006.01)
*F01D 25/24* (2006.01)
*F02C 7/04* (2006.01)
*B23Q 11/00* (2006.01)

(52) U.S. Cl.
CPC ...... *B23C 2220/64* (2013.01); *B23C 2230/00* (2013.01); *B23C 2250/04* (2013.01); *B23C 2270/18* (2013.01); *B23Q 11/0046* (2013.01); *F05D 2230/10* (2013.01)

(58) Field of Classification Search
CPC .......... B23C 2215/24; B23C 2215/242; B23C 2215/245; B23C 2270/04; B23C 2250/08; B23C 2250/04; B23C 2220/56; B23C 2220/68
See application file for complete search history.

(56) References Cited

U.S. PATENT DOCUMENTS

| | | | | |
|---|---|---|---|---|
| 3,067,651 A * | 12/1962 | Hogden | ................ | B23B 5/162 144/205 |
| 3,803,980 A * | 4/1974 | Ivanov | ................ | B23B 51/0072 144/83 |
| 4,177,610 A * | 12/1979 | Farkas | ................ | B24B 5/363 409/179 |
| 4,455,787 A | 6/1984 | Sharon | | |
| 4,478,552 A | 10/1984 | Thompson | | |
| 5,284,406 A * | 2/1994 | Mueller | ................ | B23B 47/28 408/241 B |
| 5,368,423 A * | 11/1994 | Hanna | ................ | B23C 3/00 166/55.7 |
| 8,402,625 B2 * | 3/2013 | Holmes | ................ | B23B 41/00 29/281.4 |
| 2004/0231155 A1 | 11/2004 | Le Saint et al. | | |
| 2008/0095590 A1 * | 4/2008 | Costa | ................ | B23C 3/02 409/132 |
| 2014/0223709 A1 * | 8/2014 | Clark | ................ | B23C 3/30 29/23.51 |

OTHER PUBLICATIONS

Feb. 24, 2016 Search Report issued in British Patent Application No. 1517800.7.

Mar. 9, 2016 Search Report Issued in European Patent Application No. 15 18 8941.

* cited by examiner

MACHINING TOOL

CROSS-REFERENCE TO RELATED APPLICATIONS

This application is based upon and claims the benefit of priority from British Patent Application Number 1419695.0 filed 5 Nov. 2015, the entire contents of which are incorporated by reference.

BACKGROUND

1. Field of the Disclosure

The present disclosure relates to a machining tool for machining the surface of an attrition liner that may be provided radially outward of a set of fan blades in a gas turbine engine.

2. Description of the Related Art

An attrition liner in a gas turbine engine may be provided around the fan blades with a small gap between the fan blade tip and the attrition liner. Minimising the gap may minimise over-tip leakage and thus maximise aerodynamic performance of the fan blades. In order to minimise the gap between the fan blade tip and the attrition liner, the attrition liner may be thicker than required at installation and then machined to the required thickness as part of the installation process.

It should be appreciated that the present disclosure may be applicable to circumstances in which a single section of attrition liner is being replaced. In such an arrangement, the new section of attrition liner may be machined until it has the same thickness as the sections of the attrition liner on either side that are to be retained. The present disclosure may also relate to circumstances in which the entire attrition liner, namely corresponding to the complete circumference of the fan case around the fan blades, is to be replaced. This may occur, for example, when an engine is first installed or during a major engine overhaul.

The previously known arrangements for machining newly installed attrition liners or sections of attrition liners may have drawbacks. For example, in particular for the replacement of a single section of attrition liner, it is known to machine the attrition liner to the desired thickness using a hand-held machining tool. However, such an arrangement requires a highly skilled operator to produce the required shape. Alternatively or additionally, the process may produce a large amount of dust that poses a health and safety risk to the operator. Alternatively or additionally, the process may require the operator to be in an uncomfortable position, for example kneeling, for up to four hours in order to machine a single section of the attrition liner. If the section of attrition liner to be replaced is around the top dead center of the fan case, the process may be very difficult to carry out.

For the machining of an entire attrition liner, it is known to provide dedicated tooling. However, the known equipment is heavy and is therefore a large floor-standing piece of equipment to provide stability. It may be centred on the low pressure compressor shaft and then cuts the attrition liner to a pre-set depth. However, such equipment is very large and relatively expensive. Accordingly, it may only be stationed at an engine overhaul facility. Furthermore, for the known equipment to be centralised on the low pressure compressor shaft, it requires the removal of the low pressure compressor fan disk, namely the fan blade mount that rotates on the low pressure compressor shaft. This may undesirable because once the low pressure compressor disk is removed, there is a risk of the mating faces of the low pressure compressor disk and the low pressure compressor shaft starting to corrode.

OBJECTS AND SUMMARY

It is desirable to provide an arrangement for machining attrition liners within a gas turbine engine that may at least reduce some of the disadvantages discussed above.

According to an aspect, there is provided an attrition liner machining tool that is configured to machine the surface of an attrition liner provided radially outward of a set of plurality of fan blades in a gas turbine engine in which the tool comprises at least one rotating machine tool having a connector at a first end and a cutter at a second end. The connector may be configured to rigidly connect to a rotating fan blade mount of the gas turbine engine that supports the fan blade during operation of the gas turbine engine. The cutter may be configured to be able to machine the attrition liner. Furthermore, the at least one rotating machine tool may be configured such that, when it is connected to the rotating fan blade mount and the rotating fan blade mount is rotated, the cutter passes across the surface of the attrition liner such that the cutter may machine the attrition liner. The connector may be configured to match a connector of a fan blade such that it can be received in a complementary connector of the rotating fan blade mount that is used to secure a fan blade during use of the gas turbine engine.

According to an aspect, the attrition liner machining tool may further comprise a counter-weight having a connector that is also configured to rigidly connect to the rotating fan blade mount of the gas turbine engine and has a mass selected to balance the mass of the at least one rotating machine tool when they are mounted to the rotating fan blade mount. Accordingly, for example, the attrition liner machining tool may be comprised of a single rotating machine tool and a single counter-weight that have balancing masses. In use, the rotating machine tool and the counter-weight may be mounted on opposite sides of the rotating fan blade mount.

According to an aspect, the attrition liner machining tool may comprise two of the rotating machine tools, having substantially the same configurations as each other. In such an arrangement, the first and second rotating machine tools may be mounted on opposite sides of the rotating fan blade mount from each other such that the mass of one balances the mass of the other.

According to an aspect, the attrition liner machining tool may also include a support frame that may be rigidly connected to the rotating fan blade mount of the gas turbine engine. The support frame may also connect to and provide rigid support to, the one or more rotating machine tools of the attrition liner machining tool and any counter-weight, where used.

According to an aspect, the attrition liner machining tool may be configured to manually rotate on the rotating fan blade mount of the gas turbine engine by a manual operation, for example under the control of and as a result of a force applied by the operator.

According to an aspect, the attrition liner machining tool may further comprise a base frame that is configured to be mounted to the housing of the gas turbine engine and a motor system that is configured to rotate the support frame relative to the base frame. By rotating the support frame, that is rigidly secured to the rotating fan blade mount, the motor system may be used to rotate the at least one rotating machine tool relative to the base frame. The motor system may, for example, comprise two opposing torque motors.

According to an aspect, the one or more rotating machine tools may comprise a radial adjustment mechanism that, when the rotating machine tool is rigidly connected to the rotating fan blade mount, can adjust the distance of the cutter from the axis of rotation of the rotating fan blade mount. In other words, the radial adjustment mechanism may be used to adjust the depth of cut into the attrition liner in order to provide a desired gap between the finished attrition liner and the fan blade tips.

According to an aspect, the at least one rotating machine tool may comprise an axial adjustment mechanism that, when the rotating machine tool is rigidly connected to the rotating fan blade mount, can adjust the distance of the cutter from an edge of the attrition liner in a direction parallel to the axis of rotation of the rotating fan blade mount. Such an axial adjustment mechanism may be used in order to incrementally adjust the position of the cutter of the rotating machine tool in the direction that has a component that is parallel to (for example parallel to, substantially parallel to, and/or a direction with a major component that is parallel to) the axis of rotation of the rotating fan blade mount such that each time the rotating machine tool is rotated about the axis of rotation of the rotating fan blade mount, it cuts successive sections of the attrition liner.

According to an aspect, the at least one rotating machine tool may be provided with an extractor that is configured to remove debris material that is machined from the attrition liner by the cutter.

According to an aspect, there is provided a method of machining a surface of an attrition liner in a gas turbine engine that includes a step of installing an attrition liner machining tool as discussed and/or claimed herein to the gas turbine engine. The step of installing the attrition liner machining tool may comprise connecting at least one rotating machine tool to a rotating fan blade mount of the gas turbine engine in place of a fan blade.

According to an aspect, the operator may manually rotate the at least one rotating machine tool together with the rotating fan blade mount to cause the cutter to be passed across surface of the attrition liner.

According to an aspect, a motor system may be operated in order to rotate the at least one rotating machine tool together with the rotating fan blade mount in order to cause the cutter to be passed across the surface of the attrition liner.

According to an aspect, there is provided a method of installing an attrition liner to a gas turbine engine including steps of securing an attrition liner to the gas turbine engine and machining a surface of the attrition liner using one of the above methods and/or using an attrition liner machining tool as described above in order to achieve a desired thickness of the attrition liner section. The attrition liner section may be a complete attrition liner of a gas turbine engine or may be a portion thereof.

BRIEF DESCRIPTION OF THE DRAWINGS

Examples of the disclosure will now be described, by way of non-limiting example only, with reference to the accompanying drawings, in which.

DETAILED DESCRIPTION OF EMBODIMENTS

Figure 1:
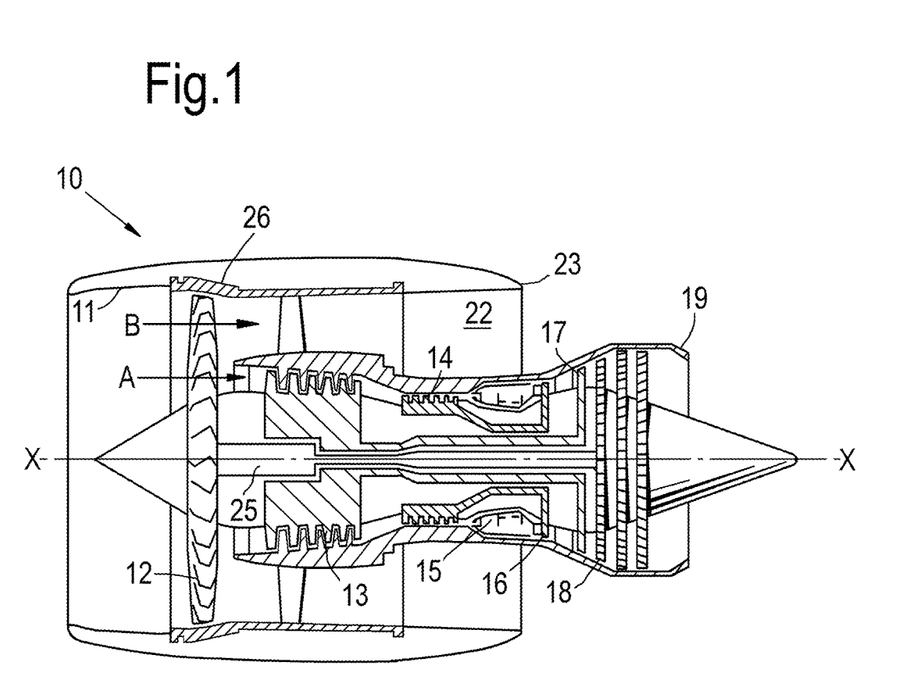
FIG. 1 shows a cross-section through a gas turbine engine.

With reference to FIG. 1, a ducted fan gas turbine engine generally indicated at 10 has a principal and rotational axis X-X. The engine 10 comprises, in axial flow series, an air intake 11, a compressive fan 12 (which may also be referred to as a low pressure compressor), an intermediate pressure compressor 13, a high-pressure compressor 14, combustion equipment 15, a high-pressure turbine 16, an intermediate pressure turbine 17, a low-pressure turbine 18 and a core exhaust nozzle 19. The engine also has a bypass duct 22 and a bypass exhaust nozzle 23.

The gas turbine engine 10 works in a conventional manner so that the air entering the intake 11 is accelerated by the fan 12 to produce two air flows; a first air flow A into the intermediate pressure compressor 13 and a second air flow B which passes through the bypass duct 22 to provide propulsive thrust. The intermediate pressure compressor 13 compresses the air flow A directed into it before delivering that air to the high pressure compressor 14 where further compression takes place. The compressed air exhausted from the high-pressure compressor 14 is directed into the combustion equipment 15 where it is mixed with fuel and the mixture combusted. The resulting hot combustion products then expand through, and thereby drive the high, intermediate and low-pressure turbines 16, 17 and 18 before being exhausted through the nozzle 19 to provide additional propulsive thrust. The high, intermediate and low-pressure turbines 16, 17, 18 respectively drive the high and intermediate pressure compressors, 14, 13 and the fan 12 by suitable interconnecting shafts.

As shown in FIG. 1, the fan 12 comprises a plurality of fan blades. The fan blades are mounted to a rotating low pressure shaft 25 by means of a rotating fan blade mount, that may also be referred to as a low pressure compressor disk. Radially outward from the fan 12, the gas turbine engine may be provided with an attrition liner 26. The attrition liner 26 may be configured to abrade in the event of contact between a fan blade tip and the attrition liner 26. In order words, part of the attrition liner 26 may be rapidly removed. Desirably, this may occur without causing damage to the fan blades. In addition, the attrition liner 26 may be configured to ensure that the material is not gradually worn away. This may reduce damage that may be caused to the fan blade if the liner were worn down which may, for example, generate significant heating.

As discussed above, it is desirable for the gap between the fan blade tips and the attrition liner 26 to be minimised. Accordingly, at the point of installation, each section of the attrition liner 26 may be thicker than required. The section of attrition liner may then be machined in order to reduce it to the desired thickness.

Figure 2:
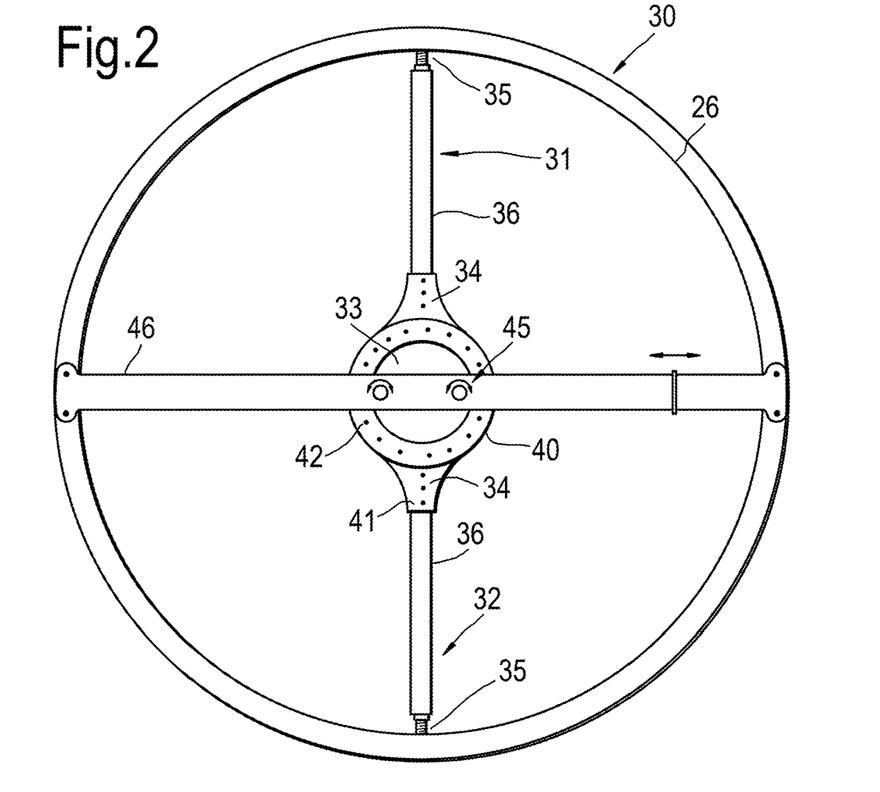
FIG. 2 depicts an attrition liner machining tool according to an example of the present disclosure.

FIG. 2 schematically depicts an attrition liner machining tool according to the present disclosure. In the configuration shown, the attrition liner machining tool 30 has first and second rotating machine tools 31, 32. For use of the attrition liner machining tool, the first and second rotating machine tools 31, 32 are secured to the rotating fan blade mount 33 that, when the gas turbine engine is in operation, supports the fan blades of the fan 12. Prior to use of the attrition liner machining tool, at least some of the fan blades may be detached from the rotating fan blade mount 33, enabling the rotating machine tools 31, 32 to be connected in their place. In practice, all of the fan blades may be removed before mounting the attrition liner machining tool 30 to the rotating fan blade mount 33, for example in order to minimise the risk of any damage to any fan blades.

At a first end of each of the rotating machine tools 31, 32, the rotating machine tools are connected to the rotating fan blade mount by a respective connector 34. At a second end of the rotating machine tools 31, 32, opposite the first end, there is provided a respective cutter 35 that is configured to machine the attrition liner 26. Between the connector 34 and the cutter 35, the rotating machine tool may have an elongate shaft 36 configured to provide substantially the desired separation between the rotating fan blade mount 33 and the surface of the attrition liner 26. The elongate shaft 36 may be formed from, for example, a composite material in order to provide high-rigidity without excessive mass. It may be desirable to minimise the mass of the attrition liner machining tool in order to facilitate the use of the tool and/or in order to provide an attrition liner machining tool that is capable of being transported to a required location of use, namely is not limited to use within, for example, an engine overhaul facility.

As discussed above, the connector 34 may be configured to connect the rotating machine tool 31 to the rotating fan blade mount of the gas turbine engine. This may be desirable because it may minimise the extent to which the gas turbine engine must be disassembled prior to installing an attrition liner or a section of an attrition liner. In particular, it may therefore not be necessary to remove a rotating fan blade mount, reducing the time taken to perform the operation. Furthermore, as discussed above, removing a rotating fan blade mount may expose the mating surface between the rotating fan blade mount 33 and the low-pressure compressor shaft 25, which may increase the risk of corrosion.

Figure 3:
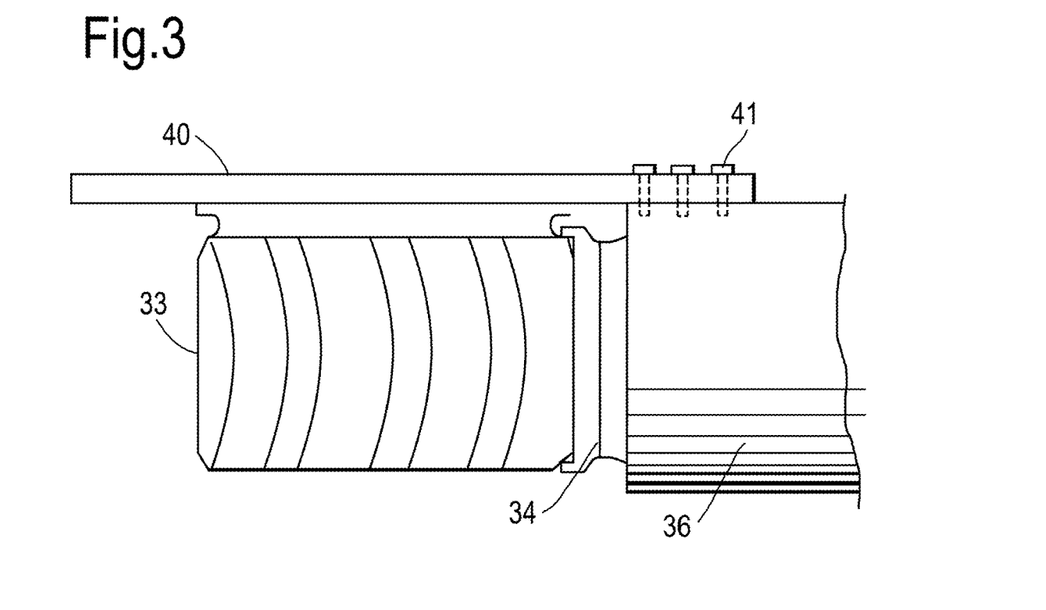
FIG. 3 depicts a possible connection mechanism for connecting part of an attrition liner machining tool to a rotating fan blade mount of a gas turbine engine.

FIG. 3 depicts in cross-section a connector 34 in more detail. The connector 34 of the rotating machine tool 31 may be configured to correspond to the connector used to connect a fan blade to the rotating fan blade mount 33. In other words, the connector 34 of the rotating machine tool 31 may have the same shape as the connectors provided on the fan blades to connect them to the rotating fan blade mount. Accordingly, the connector 34 of the rotating machine tool 31 may be inserted into the complementary connector within the rotating fan blade mount 33, known as the fan disk dovetail slots, that are used to secure and support the fan blades during operation of the gas turbine engine. Utilising the same connection mechanism for the rotating machine tool 31 as is used for supporting the fan blade may ensure that the rotating machine tool 31 is accurately centred on the axis of rotation of the low pressure compressor shaft 25. Furthermore, it may minimise the requirement to provide additional components to mount or support the attrition liner machining tool.

As shown in FIG. 3, a support frame 40 may be provided. This may provide additional support for the at least one rotating machine tool 31, for example in order to minimise any movement of the rotating machine tool 31 relative to the rotating fan blade mount 33. The support frame 40 may be mounted to the rotating fan blade mount 33 and may be secured to the first end of the rotating machine tool 31 by one or more fixings such as bolts 41 in order to provide a ridged connection. Optionally, the support frame 40 may be rigidly connected to the rotating fan blade mount 33, for example by one or more fixings 42 such as bolts.

In order to machine the surface of the attrition liner 26 once the attrition liner machining tool has been installed to the rotating fan blade mount of the gas turbine engine, the assembly of the rotating fan blade mount and any rotating machine tool mounted thereon may be rotated about the axis of rotation of the rotating fan blade mount 33.

In the arrangement depicted in FIG. 2, the attrition liner machining tool 30 has two rotating machine tools 31, 32 mounted on opposite sides of the rotating fan blade mount 33. Accordingly, the mass of the two rotating machine tools 31, 32 balances each other facilitating the rotation attrition liner machining tool about the axis of rotation of the fan blade mount.

As the attrition liner machining tool rotates, the cutters 35 may cut a cut line through the surface of the attrition liner 26 along an arc that is centred on the axis of rotation of the rotating fan blade mount 33. Accordingly, an accurately cut curve may be provided to the surface of the attrition liner 26. This may be easier than previously known systems for machining an attrition liner 26, which may have relied on the skill of an operator to provide a desired surface shape.

Figure 4:
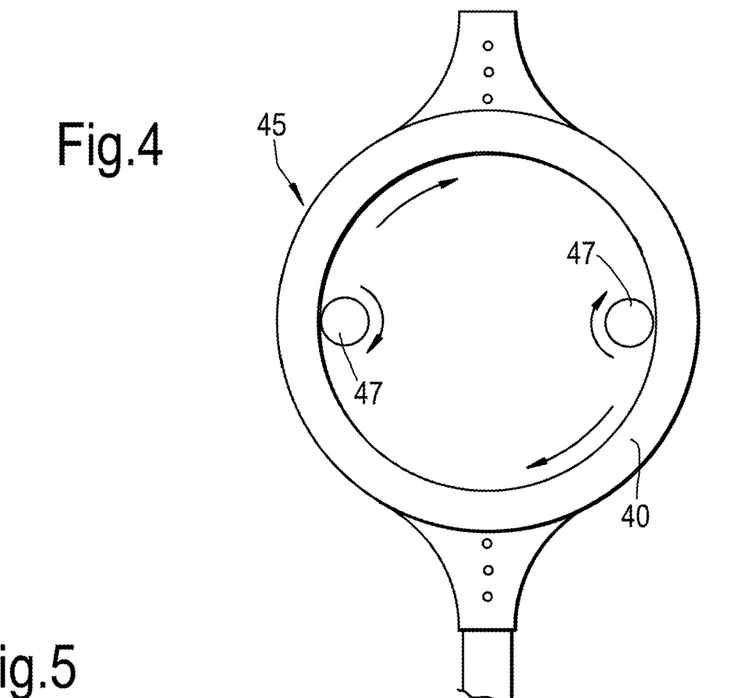
FIG. 4 depicts a motor system according to an example of the present disclosure.

The attrition liner machining tool may be configured such that the operator may manually rotate the at least one rotating machine tool 31, 32, together with the rotating fan blade mount 33. Alternatively or additionally, the attrition liner machining tool 30 may be provided with a motor system 45 that may be used to rotate the at least one rotating machine tool 31, 32 and the rotating fan blade mount 33 relative to the attrition liner 26. FIG. 4 depicts in greater detail an example of such a motor system 45. The motor system 45 may be configured to act between the support frame 34 and a base frame 46 that is secured in a fixed position relative to the attrition liner 26. For example, the base frame 46 may be rigidly connected to mounting points provided on the gas turbine engine housing.

In an arrangement, the motor system 45 may include two opposing torque motors that are configured to drive the inner diameter of the support frame 40. It will be appreciated, however, that other motor systems may easily be employed, for example motor systems comprising just a single motor.

Figure 5:
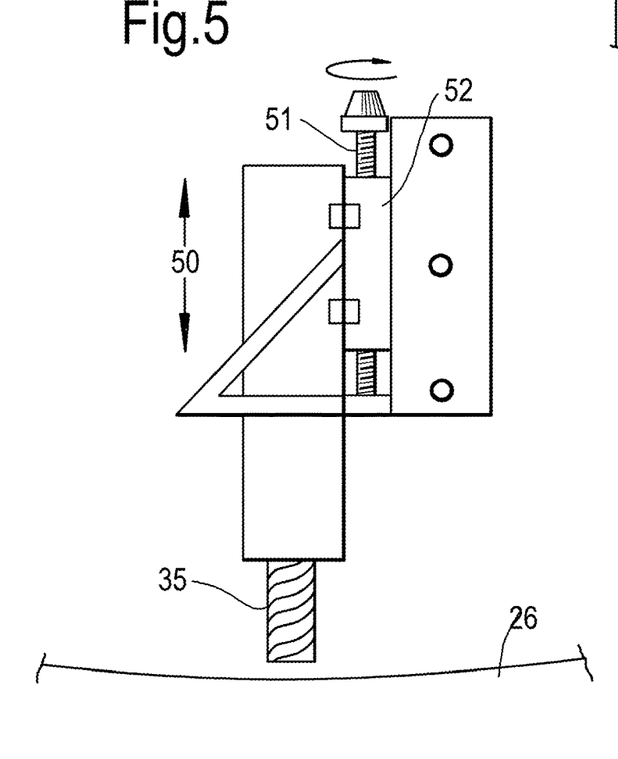
FIG. 5 depicts an adjustment mechanism according to an example of the present disclosure.

Each of the rotating machine tools 31, 32 may include a radial adjustment mechanism 50, such as schematically depicted in FIG. 5. The radial adjustment mechanism 50 may be provided in order to adjust the distance between the cutter 35 and the axis of rotation of rotating fan blade mount 33. Accordingly, during use of the attrition liner machining tool, the radial adjustment mechanism may be used in order to control the depth of cut by the cutter 35. This in turn may control the position of the final surface of the attrition liner 26 relative to the axis of rotation of the rotating fan blade mount, enabling control of the size of gap between the surface of the finished attrition liner 26 and the fan blade tip.

The radial adjustment mechanism 50 may be formed from any suitable mechanical or electro-mechanical system. For example, as depicted, it may be based upon a rotating threaded bar 51 used in conjunction with a slider 52 that is moved up and down the threaded bar 51 as it rotates. Alternatively, for example, the mechanism may be based on a rack and pinion mechanism.

In either case, the radial adjustment mechanism 50 may be configured to be manually adjusted such that the operator can directly set a required position for the cutter 35 relative to the axis of rotation of the rotating fan blade mount 33.

Alternatively or additionally, the radial adjustment mechanism 50 may be adjusted by way of an actuator under the control of a central control system. Such an arrangement may be appropriate if it is desirable to adjust the position of the cutter during use rather than setting the position of the cutter 35 to a single fixed distance relative to the axis of rotation of the rotating fan blade mount 33. For example, adjustment during use may be desired if the surface of the attrition liner 26 is to be cut to a non-circular shape, for example in order to compensate for a small deformation of the shape of the fan casing when the gas turbine engine is unloaded due to the removal of the fan blades.

In order to control machining to a non-circular shape, the attrition liner machining tool may comprise sensors to measure the position of the fan casing relative to the axis of rotation of the rotating fan blade mount 33 and adjust the position of the cutter 35 accordingly. Alternatively or additionally, the attrition liner machining tool 31, 32 may comprise one or more sensors to determine the position of the rotating machine tool 31, 32 as they are rotated and apply an offset to the desired position of the cutter 35 based on the known behaviour of the gas turbine engine, namely the manner in which components deform, when it is unloaded due to the removal of the fan blades.

Figure 6:
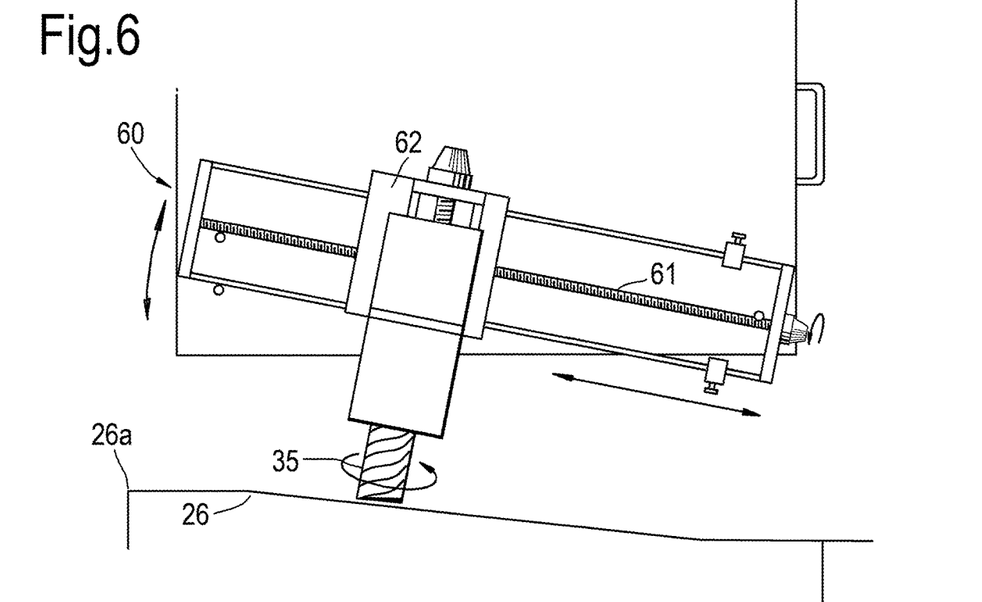
FIG. 6 depicts an adjustment mechanism according to an example of the present disclosure.

In an arrangement, the attrition liner machining tool may include an axial adjustment mechanism 60 that may be used to adjust the distance of the cutter 35 from an edge 26a of the attrition liner 26 in a direction that is parallel to the axis of rotation of the rotating fan blade mount 33. Accordingly, the rotating machine tool 31, 32 may be successively advanced across the surface of the attrition liner 26, permitting the machining of adjacent strips of the attrition liner 26 until the entire surface of the attrition liner 26 has been machined to the required thickness.

As with the radial adjustment mechanism 50 discussed above, the axial adjustment mechanism 60 may be configured such that it may be adjusted manually by the operator and/or may be configured such that it can be controlled by an actuator under the control of a central controller. Similarly, the axial adjustment mechanism 60 may, as depicted, be based on a rotating threaded bar 61 that engages a sliding component 62. However, other mechanisms may also be employed to control the position of the cutter 35, for example based on a rack and pinion mechanism or any other mechanical and/or electro-mechanical system.

As shown in FIG. 6, the desired surface of the attrition liner 26 may not be parallel to the axis of rotation of the rotating fan blade mount. In that case, the axial adjustment mechanism 60 may be provided at an inclined angle such that the movement of the cutter 35 by the axial adjustment mechanism 60 adjusts the position of the cutter 35 parallel to the desired surface of the attrition liner 26.

In use, the axial adjustment mechanism 60 may be used to move the position of the cutter 35 by successive increments between each pass of the cutter across the surface of the attrition liner 26. The axial adjustment mechanism 60 may be controlled or configured to ensure that the incremental movement ensures a small overlap between the successive cuts in order to ensure that no ridges of material remain. For example, the increments in the direction parallel to the axis of rotation of the rotating fan blade mount 33 may be equivalent to approximately 90% of the size of the cutting head on the cutter 35.

Figure 7:
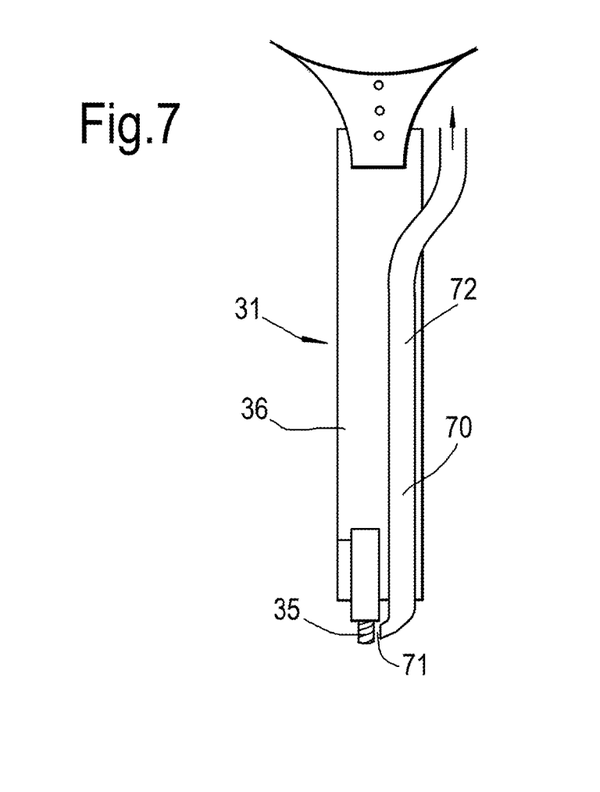
FIG. 7 depicts an extraction system according to an example of the present disclosure.

In an arrangement, each of the rotating machine tools 31 may be provided with an extractor 70 that is configured to remove debris material machined from the attrition liner 26 by the cutter 35. Such an arrangement is depicted in FIG. 7.

The extractor 70 may be arranged to rotate with the rotating machine tool 31, for example may be mounted to the elongate shaft 36.

The extractor 70 may include an extraction opening 71 that is provided adjacent to the cutter 35 and into which debris material may be drawn. The extractor, for example, include a conduit 72 that connects the extraction opening 71 to a vacuum source, ensuring a flow of air into the extraction system 70, drawing in the debris material. In such an arrangement, the extraction opening 71 may be provided in a fixed position relative to the cutter 35 as the rotating machine tool rotates about the axis of rotation of the rotating fan blade mount.

The extraction system 70 may be configured such that the position of the extraction opening 71 is adjusted by the operation of a radial adjustment mechanism 50, such as that discussed above, in order to maintain the position of the extraction opening 71 relative to the cutter 35 when the position of the cutter 35 is adjusted by the radial adjustment mechanism 50. In an alternative arrangement, the position of the extraction opening 71 may not be adjusted by the operation of the radial adjustment mechanism 50 adjusting the position of the cutter 35. In such an arrangement, the extraction opening 71 may have a sufficient size and may be appropriately arranged such that the extractor 70 is effective for all positions of the cutter 35 that can be provided by the radial adjustment mechanism 50.

The attrition liner machining tool has been discussed above in the context of an arrangement having two rotating machine tools 31, 32. However, it should be appreciated that the present disclosure is not limited to such an arrangement. In particular, a greater number of rotating machine tools may be used. For example, this may be desirable if an entire attrition liner is to be machined as this may enable faster operation. In the event of a greater number of rotating machine tools being used, it will be appreciated that the arrangement of the rotating machine tools around the rotating fan blade mount 33 may be selected in order to balance the masses around the axis of rotation of the rotating fan blade mount.

Figure 8:
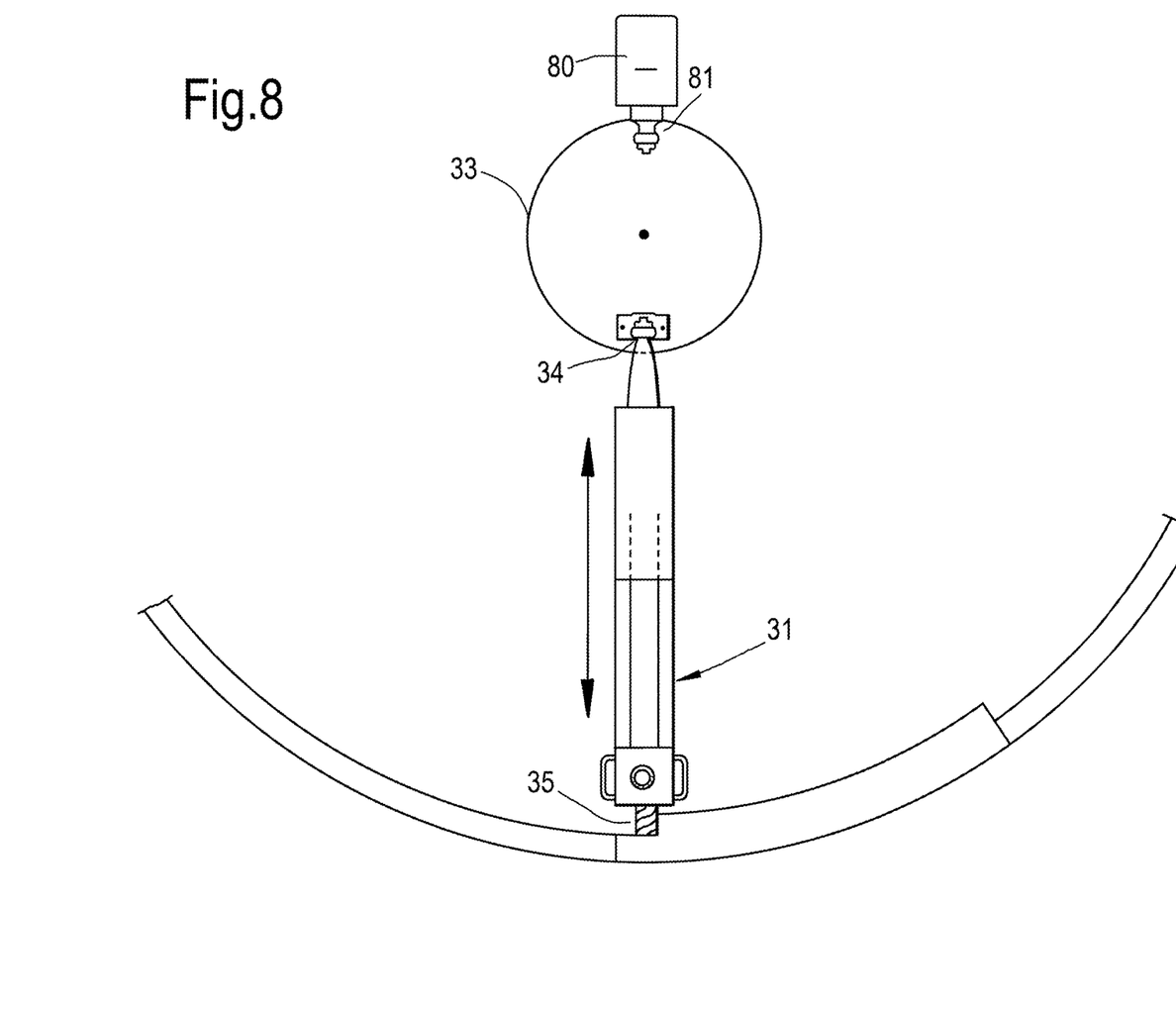
FIG. 8 depicts an attrition liner machining tool according to an example of the present disclosure.

In an arrangement of the present disclosure, an attrition liner machining tool may be provided that includes a single rotating machine tool 31. Such an arrangement is schematically depicted in FIG. 8. This may provide an attrition liner machining tool that is especially portable. It may therefore be capable of being used in any location in which it may be desired to replace a section of an attrition liner.

As shown, in such an arrangement of an attrition liner machining tool, in order to facilitate the rotation of the rotating machine tool about the axis of rotation of the rotating fan blade mount 33, a counter-weight 80 may be provided. The counter-weight 80 may include a connector 81 for connecting the counter-weight 80 to the rotating fan blade mount 33. As with the connector 34 of the rotating machine tool 31, the connector 81 of the counter-weight 80 may be configured to connect to the rotating fan blade mount 33 using the same connection system as the fan blades. Although not shown in FIG. 8 for clarity, a support frame 40 may be provided to which both the rotating machine tool 31 and the counter-weight 80 may be secured in order to reduce any possible movement of the rotating machine tool 31 and/or the counter-weight 80 relative to the rotating fan blade mount 33.

It should be appreciated that in an arrangement using a single rotating machine tool, such as that depicted in FIG. 8, a counter-weight may not be required. In an arrangement, when the fan blades are detached from the rotating fan blade mount in order to attach the rotating machine tool, one or more fan blades may be retained to function as a counter-weight. For example, one or more fan blades on the opposite side of the axis of rotation of the rotating fan blade mount from the location at which the rotating machine tool is attached may be retained. The mass of the rotating machine tool and/or its mass distribution may be selected such that it is balanced by the one or more retained fan blades.

It should be appreciated that the cutter 35 used with the attrition liner machining tool of the present disclosure may be any suitable cutter that can be used to machine the surface of the attrition liner 26 in particular, the cutter 35 may include an electric motor configured to rotate a cutter head. If the attrition liner machining tool is to be controlled by the operator, a dead man's switch may be provided to stop the cutting head if the control handle is released. Optionally, the cutting head may be configured to stop instantly if the dead man's switch is released rather than scrolled down to a slow stop.

In general, the attrition liner machining tool of the present disclosure may be provided as a kit of parts to be temporarily installed to a gas turbine engine after removal of at least one fan blade. The kit may contain one or more of the rotating machine tools described above and optionally may contain a counter-weight. The kit may be provided to operate in a single configuration, for example only with two rotating machining tools, or may be configured to be capable of being used in multiple configurations, for example additionally in a configuration of one rotating machine tool used in conjunction with a counter-weight.

An attrition liner machining tool of the present disclosure may be configured for use with one specific design of gas turbine engine. Alternatively it may be configured to be capable of being installed to any of a plurality of designs of gas turbines engines.

I claim:

1. An attrition liner machining tool, configured to machine a surface of an attrition liner provided radially outward of a set of a plurality of fan blades in a gas turbine engine, the attrition liner machining tool comprising:
   at least one rotating machine tool having a first end and a second end, the second end being opposite the first end;
   a connector at the first end of the at least one rotating machine tool;
   a cutter at the second end of the at least one rotating machine tool;
   a counter-weight having a second connector configured to rigidly connect to the rotating fan blade mount of the gas turbine engine and having a mass selected to balance a mass of the at least one rotating machine tool when mounted to the rotating fan blade mount;
   a support frame, configured to be rigidly connected to the rotating fan blade mount of the gas turbine engine and to support the rotating machine tool and the counter-weight or a first and second rotating machine tool in respective locations on the rotating fan blade mount;
   a base frame, configured to be mounted to the gas turbine engine in a fixed position relative to the attrition liner; and
   a motor system, configured to rotate the support frame relative to the base frame,
   wherein the connector is configured to rigidly connect to a rotating fan blade mount of the gas turbine engine that, in use of the gas turbine engine, supports the fan blades, the connector being configured to fit a complementary connector in the rotating fan blade mount that, in use of the gas turbine engine, is configured to securely receive a connector of a fan blade;
   the cutter is configured to machine the attrition liner; and
   the at least one rotating machine tool is configured such that, when it is connected to said rotating fan blade mount of the gas turbine engine, the cutter is passed across the surface of the attrition liner when said rotating fan blade mount is rotated.

2. The attrition liner machining tool according to claim 1, further comprising a second rotating machine tool that is the same as the first rotating machine tool.

3. The attrition liner machining tool as claimed in claim 1, wherein the motor system comprises two opposing torque motors.

4. The attrition liner machining tool as claimed in claim 1, wherein the at least one rotating machine tool comprises a radial adjustment mechanism that is configured such that, when the rotating machine tool is rigidly connected to the rotating fan blade mount, the radial adjustment mechanism is configured to adjust the distance of the cutter from an axis of rotation of the rotating fan blade mount.

5. The attrition liner machining tool as claimed in claim 1, wherein the at least one rotating machine tool comprises an axial adjustment mechanism that is configured such that, when the rotating machine tool is rigidly connected to the rotating fan blade mount, the axial adjustment mechanism is configured to adjust the distance of the cutter from an edge of the attrition liner in a direction that has a component that is parallel to an axis of rotation of the rotating fan blade mount.

6. The attrition liner machining tool as claimed in claim 1, wherein the at least one rotating machine tool further comprises an extractor, configured to remove debris material machined from the attrition liner by the cutter.

7. The attrition liner machining tool according to claim 6, wherein the extractor is configured such that an extraction opening into which debris material is drawn is provided at a fixed position relative to the cutter when the cutter is moved in operation of the attrition liner machining tool.

8. An assembly comprising a gas turbine engine and the attrition liner machining tool according to claim 1, wherein the at least one rotating machine tool of the attrition liner machining tool is connected to the rotating fan blade mount of the gas turbine engine in place of a fan blade.

9. A method of machining a surface of an attrition liner in a gas turbine engine, comprising installing the attrition liner machining tool according to claim 1 to the gas turbine engine;
   wherein installing the attrition liner machining tool comprises connecting the at least one rotating machine tool to the rotating fan blade mount of the gas turbine engine in place of a fan blade.

10. The method of machining a surface of an attrition liner in a gas turbine engine according to claim 9, wherein an operator manually rotates the at least one rotating machine tool together with the rotating fan blade mount to cause the cutter to be passed across the surface of the attrition liner.

11. The method of machining a surface of an attrition liner in a gas turbine engine according to claim 9, wherein a motor system is operated to rotate a support frame relative to a base frame such that the at least one rotating machine tool rotates together with the rotating fan blade mount to cause the cutter to be passed across the surface of the attrition liner.

12. A method of installing an attrition liner section to a gas turbine engine, comprising:
   securing an attrition liner section to the gas turbine engine; and machining a surface of the attrition liner using the method of claim 9 to achieve a desired thickness of the attrition liner section.

13. A method of installing an attrition liner section to a gas turbine engine, comprising:

securing an attrition liner section to the gas turbine engine; and machining a surface of the attrition liner using the apparatus of claim 1 to achieve a desired thickness of the attrition liner section.

14. The attrition liner machining tool as claimed in claim 1, wherein the connector is a dovetail connector configured to be inserted into a complementary dovetail slot in the rotating fan blade mount that, in use of the gas turbine engine, is configured to securely receive a dovetail connector of the fan blade.

* * * * *